E. M. POTTER.
Cultivator and Harrow Combined.
No. 163,523. Patented May 18, 1875.
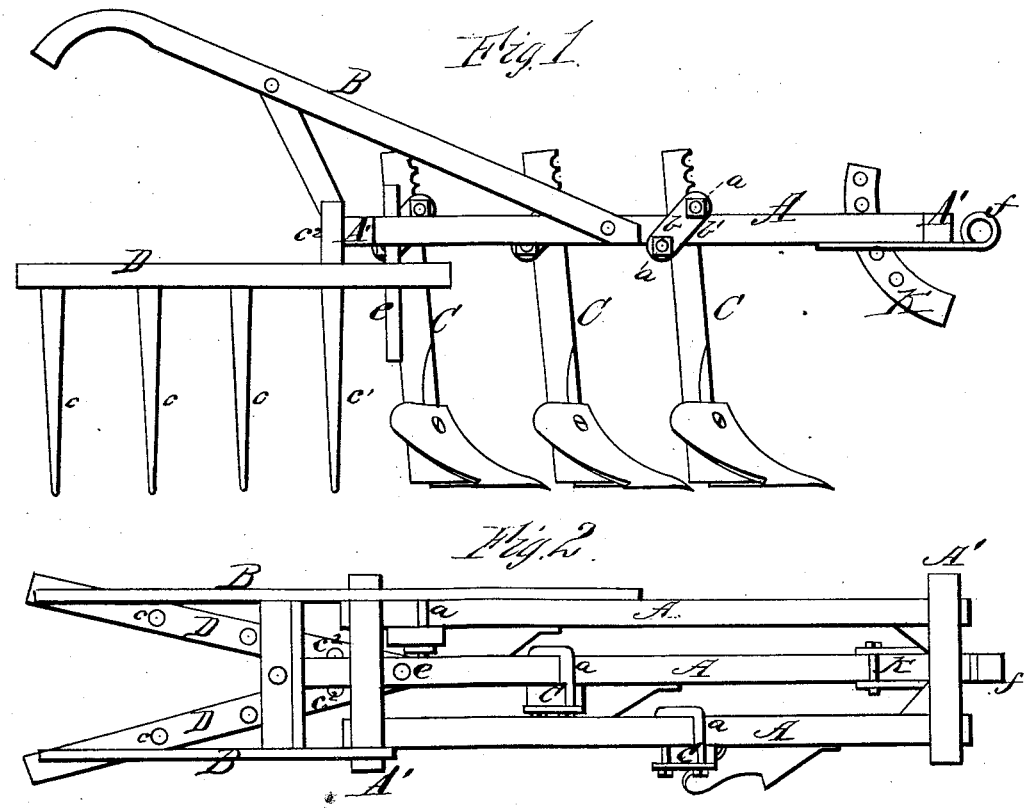
WITNESSES
Robert Everett
H. Bates
INVENTOR
E. M. Potter
Chipman Hosmer & Co.
ATTORNEYS

UNITED STATES PATENT OFFICE.

ELIAS M. POTTER, OF RUTHERFORD DEPOT, TENNESSEE.

IMPROVEMENT IN CULTIVATORS AND HARROWS COMBINED.

Specification forming part of Letters Patent No. 163,523, dated May 18, 1875; application filed February 13, 1875.

*To all whom it may concern:*

Be it known that I, ELIAS M. POTTER, of Rutherford Depot, in the county of Gibson and State of Tennessee, have invented a new and valuable Improvement in Cultivator and Harrow; and I do hereby declare that the following is a full, clear, and exact description of the construction and operation of the same, reference being had to the annexed drawings making a part of this specification, and to the letters and figures of reference marked thereon.

Figure 1 of the drawing is a representation of a side view of my cultivator and harrow, and Fig. 2 is a plan view of the same.

This invention has relation to means for cultivating and harrowing the soil at the same time; and it consists in combining with a plow-stock, carrying a gang of plows, a triangular harrow, open in the rear, and connected to the said stock by means of pivot and steady pins, as will be hereinafter explained.

In the annexed drawings, Figs. 1 and 2, I have represented three light turn-plows, which are arranged in a gang, and secured to a stock consisting of three beams, A A A, connected together at suitable distances apart by means of end pieces A', and provided with handles B B. The standards C of the plows are perpendicular to the stock, and they are secured to their respective beams composing this stock by means of screw-threaded staples $a$ and nuts $b$. The front edges of the standards C are notched, as shown in Fig. 1, to receive the upper limbs of the staple-fastenings $a$, and prevent the standards from slipping.

In combination with the gang of plows, above described, I use a harrow, the teeth $c\ c^1$ of which are secured to forwardly-converging beams D D. This harrow is connected to the middle beam of the plow-stock by means of a vertical pin, $e$, which is long enough to allow the necessary vertical play of the harrow when the machine is in operation, and which also allows the harrow to vibrate laterally. The harrow-beams are not connected together in rear, and they are prevented from receiving undue lateral vibration by means of extensions $c^2\ c^2$ of the two front teeth $c^1$ rising in rear of the rear cross-bar A' of the plow-stock. By these means the driver can walk between the harrow-beams, and conveniently control the plow by its handles, and the harrow-beams can be made any desired length without interfering with the legs of the driver walking between them.

I may use a double-tree or a single-tree, and attach the same to a draft-eye, $f$, or to an adjustable segment-shaped clevis, $k$, as shown.

What I claim as new, and desire to secure by Letters Patent, is—

In combination with the plow-stock A, the triangular harrow, loosely connected by means of the pin $e$, and limited in lateral vibration by the steady-pins $c^2\ c^2$, substantially as described.

In testimony that I claim the above I have hereunto subscribed my name in the presence of two witnesses.

E. M. POTTER.

Witnesses:
D. F. HALLIBURTON,
J. C. HOLMES.